United States Patent
Shah et al.

(10) Patent No.: US 8,126,773 B2
(45) Date of Patent: Feb. 28, 2012

(54) CONFIGURABLE ENROLLMENT DATA CAPTURE FRAMEWORK

(75) Inventors: Shyam Shah, Hyderabad (IN); Pavan Kodipalli, Kumool (IN); Neeta Chilumula, Hyderabad (IN); Siju Narayan, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 363 days.

(21) Appl. No.: 11/463,888

(22) Filed: Aug. 10, 2006

(65) Prior Publication Data

US 2008/0027832 A1 Jan. 31, 2008

(51) Int. Cl.
*G06Q 30/00* (2006.01)

(52) U.S. Cl. ............... 705/14.36; 705/14.1; 705/26.1

(58) Field of Classification Search .............. None
See application file for complete search history.

(56) References Cited

U.S. PATENT DOCUMENTS

| | | | |
|---|---|---|---|
| 5,969,974 A | 10/1999 | Vandenbelt et al. | |
| 6,138,911 A | 10/2000 | Fredregill et al. | |
| 6,829,586 B2 | 12/2004 | Postrel | |
| 7,099,803 B1 * | 8/2006 | Rappoport et al. | 703/1 |
| 7,134,087 B2 | 11/2006 | Bushold et al. | |
| 7,562,810 B2 | 7/2009 | Rao et al. | |
| 7,837,099 B2 | 11/2010 | Kamat et al. | |
| 2001/0037241 A1 | 11/2001 | Puri | |
| 2001/0054003 A1 | 12/2001 | Chien et al. | |
| 2002/0026348 A1 | 2/2002 | Fowler et al. | |
| 2002/0059103 A1 | 5/2002 | Anderson et al. | |
| 2002/0065716 A1 | 5/2002 | Kuschill | |
| 2002/0174011 A1 | 11/2002 | Sanchez et al. | |
| 2003/0032474 A1 | 2/2003 | Kaminkow | |
| 2003/0115100 A1 | 6/2003 | Teicher | |
| 2003/0200141 A1 | 10/2003 | Robison | |
| 2003/0225618 A1 | 12/2003 | Hessburg et al. | |
| 2003/0225619 A1 | 12/2003 | Dokken et al. | |
| 2003/0229522 A1 * | 12/2003 | Thompson et al. | 705/4 |
| 2003/0229541 A1 | 12/2003 | Randall et al. | |
| 2003/0236712 A1 | 12/2003 | Antonucci et al. | |
| 2004/0098306 A1 * | 5/2004 | Fitzpatrick et al. | 705/14 |
| 2005/0240472 A1 | 10/2005 | Postrel | |
| 2005/0267800 A1 | 12/2005 | Tietzen et al. | |
| 2006/0031120 A1 * | 2/2006 | Roehr et al. | 705/14 |
| 2006/0111978 A1 | 5/2006 | Tietzen et al. | |
| 2006/0161478 A1 | 7/2006 | Turner et al. | |
| 2006/0178986 A1 | 8/2006 | Giordano et al. | |
| 2006/0248007 A1 | 11/2006 | Hofer et al. | |
| 2006/0253321 A1 * | 11/2006 | Heywood | 705/14 |
| 2008/0021772 A1 * | 1/2008 | Aloni et al. | 705/14 |
| 2008/0023541 A1 | 1/2008 | Kamat et al. | |

(Continued)

OTHER PUBLICATIONS

U.S. Appl. No. 11/463,889, filed Aug. 10, 2006, Office Action dated Mar. 8, 2010, 18 pages.

(Continued)

*Primary Examiner* — Mussa A Shaawat

(74) *Attorney, Agent, or Firm* — Kilpatrick Townsend & Stockton LLP

(57) ABSTRACT

Methods for defining and using a configurable and extensible enrollment data capture framework. The enrollment data capture framework allows generation of enrollment data capture templates for specifying channel, membership scheme and membership type specific data elements, providing data relevancy and data adequacy. The framework comprises an extensible membership attribute repository, as well as configurable enrollment data capture templates specific to a membership scheme and type and channel combination.

13 Claims, 2 Drawing Sheets

U.S. PATENT DOCUMENTS

| | | | |
|---|---|---|---|
| 2008/0023542 A1 | 1/2008 | Kamat et al. | |
| 2008/0027797 A1 | 1/2008 | Joshi et al. | |
| 2008/0077498 A1* | 3/2008 | Ariff et al. | 705/14 |
| 2008/0077499 A1* | 3/2008 | Ariff et al. | 705/14 |

OTHER PUBLICATIONS

U.S. Appl. No. 11/463,887, filed Aug. 10, 2006, Office Action dated Oct. 2, 2009, 5 pages.

U.S. Appl. No. 11/463,887, filed Aug. 10, 2006, Ex Parte Quayle Action dated Mar. 29, 2010, 6 pages.

U.S. Appl. No. 11/463,885, filed Aug. 10, 2006, Office Action dated Apr. 1, 2008, 9 pages.

U.S. Appl. No. 11/463,885, filed Aug. 10, 2006, Final Office Action dated Oct. 22, 2008, 11 pages.

U.S. Appl. No. 11/463,885, filed Aug. 10, 2006, Advisory Action dated Jan. 13, 2009, 3 pages.

U.S. Appl. No. 11/463,885, filed Aug. 10, 2006, Notice of Allowance dated Mar. 20, 2009, 10 pages.

U.S. Appl. No. 11/463,879, filed Aug. 10, 2006, Office Action dated Jan. 23, 2009, 20 pages.

U.S. Appl. No. 11/463,879, filed Aug. 10, 2006, Final Office Action dated Aug. 18, 2009, 20 pages.

U.S. Appl. No. 11/463,879, filed Aug. 10, 2006, Advisory Action dated Oct. 23, 2009, 3 pages.

U.S. Appl. No. 11/463,879, filed Aug. 10, 2006, Office Action dated Jan. 28, 2010, 17 pages.

U.S. Appl. No. 11/463,879, filed Aug. 10, 2006, Final Office Action dated Jul. 20, 2010, 21 pages.

U.S. Appl. No. 11/463,887, filed Aug. 10, 2006, Notice of Allowance dated Jul. 22, 2010, 6 pages.

U.S. Appl. No. 11/463,889, filed Aug. 10, 2006, Final Office Action dated Aug. 5, 2010, 14 pages.

U.S. Appl. No. 11/463,889, filed Aug. 10, 2006, Advisory Action dated Oct. 19, 2010, 3 pages.

\* cited by examiner

CONFIGURABLE ENROLLMENT DATA CAPTURE FRAMEWORK

BACKGROUND

Related Art

Airlines, in order to be more competitive, have stressed on the creation of a set of loyal customers in order to ensure a constant stream of revenue. In part, this is based on studies, which have shown that it costs about ten times more to acquire new customers than to keep existing ones, and that increasing customer retention by 5% could increase profits by 25% to 95%. Frequent flyer programs (FFPs) were thus adopted as an effective means of attracting and retaining loyal customers.

Loyalty programs attract and acquire members through a formal process of enrollment into various targeted membership schemes through various channels. Often, one of the biggest hurdles that airlines face is the lack of a robust enrollment framework that is configurable and scores high on the information relevancy factor, taking into account the channel through which enrollments have been effected.

Data about prospective members captured during enrollment forms the bedrock of customer management. Therefore, such data needs to be adequate (for optimal customer knowledge) and relevant (to the membership scheme and the type of membership being sought). For greater reach and ease of enrollment, airlines today facilitate enrollment through a variety of channels. These channels dictate the type and quantum of information that can be captured at the time of enrollment. For example, an airline may choose to enroll members through the Internet and through Short Messaging Service (SMS). In the case of members enrolling through the web, a host of personal information can be sought, while enrolling through SMS would fetch minimal information, such as simply a mobile phone number. This demands a configurable and extensible enrollment framework that provides adequacy of information for forming a basis for a sound customer knowledge base, as well as relevancy with regards to the membership scheme, type and channel used for enrollment. Currently, airlines lack such a configurable enrollment data capture framework to meet the above-mentioned objectives.

SUMMARY

The present invention provides methods for defining and using a configurable and extensible enrollment data capture framework. An enrollment data capture framework allows generation of enrollment data capture templates for specifying channel, membership scheme and membership type specific data elements, providing data relevancy and data adequacy. The framework comprises an extensible membership attribute repository, as well as configurable enrollment data capture templates specific to a membership scheme, type and channel combination.

DETAILED DESCRIPTION

Figure 1:
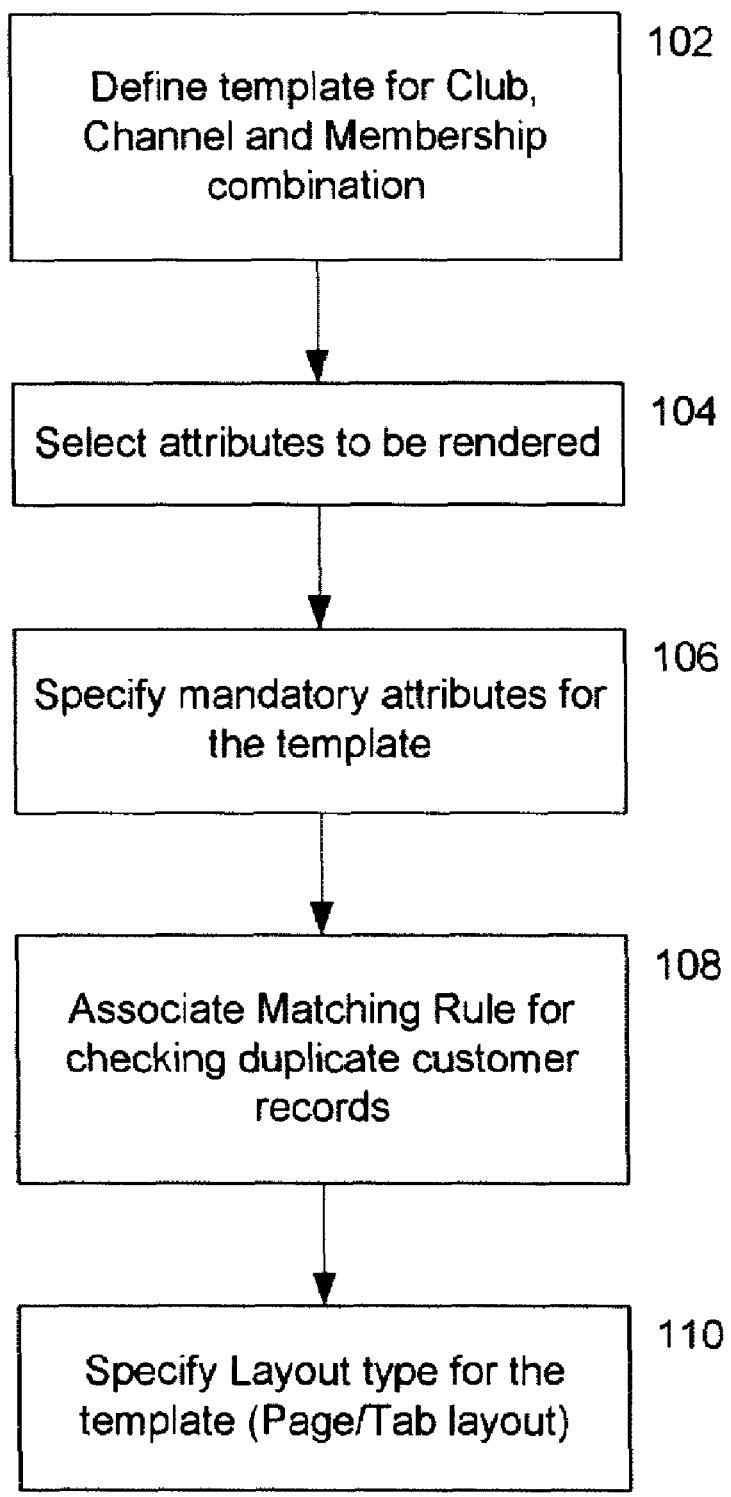
FIG. 1 is a flow diagram illustrating a method for defining a configurable enrollment data capture template, in accordance with an embodiment of the present invention.

In the following description, reference is made to airlines for ease of exposition. However, it is understood that the presented techniques may be used by any business or entity that incorporates a loyalty program as part of its operation.

Loyalty programs do not currently provide the flexibility to capture member information specific to a membership scheme, membership type, and channel used for enrollment. As a result, the adequacy and relevance of the captured member data suffer. Consequently, since data captured at enrollment time about prospective members forms a basis for customer management, this in turn prevents airlines from effective prospect targeting and from delivering high impact customer differentiation. Accordingly, the present invention describes novel techniques for defining and using a configurable and extensible enrollment data capture framework.

For greater reach and ease of member enrollment, airlines facilitate enrollment through a variety of channels. A channel dictates or restrains the type and quantum of information to be collected at the time of member enrollment.

For example, an airline may choose to enroll members through the Internet. For a member enrolling via the Internet, a host of member specific personal information may be requested and collected. As another example, an airline may choose to enroll a member through SMS. In contrast to Internet enrollment, a member enrolling via SMS may only supply a minimal amount of information, such as the member's mobile phone number.

Likewise, depending on membership type, the information solicited from members at the time of enrolment may also be different. For instance, the type of information solicited from corporate members/companies will be different from that solicited from a family that seeks to enroll as one member entity. In the former case, information sought will revolve around factors such as number of employees in the company, its annual travel budget, its world wide offices, number of employees in the corporate rung who travel frequently and so on.

Further, depending on a membership scheme opted for by members, the information solicited from members at the time of enrolment may also be different. For instance, the type of information solicited from members who opt for a particular membership scheme such as Senior citizen's club will be different from those seeking membership in 'Chairmen's club' exclusively mean't for chairmen's of companies belonging to certain industries.

Accordingly, the present invention describes a configurable and extensible enrollment framework. Such a framework provides member data adequacy, thereby allowing for accuracy in the customer knowledge base. Further more, such a framework allows tailoring of the data to be collected for a specific membership scheme, membership type and channel used for enrollment, thereby increasing the relevance of the collected data to the particular enrollment parameters. We now turn to describing configurable enrollment data capture templates.

FIG. 1 is a flow diagram illustrating a method for defining a configurable enrollment data capture template, in accordance with an embodiment of the present invention. At step 102, a particular set of enrollment parameters such as membership scheme, channel and membership type combination is chosen for the template that is being defined. It will be known to those of ordinary skill in the art that a particular membership scheme may be represented by a club. Once defined, the template represents a set of information to be collected from a prospective member whenever the enrollment circumstances are in accordance with the particular parameters of the template.

At step 104, one or more attributes are selected to be rendered for the template. Once a set of attributes is selected, step 106 specifies one or more mandatory attributes for the template. In order to detect duplicate member records, in step 108 a rule ("matching rule") is associated with the particular template at hand. This rule comprises logic for indicating (i.e. matching) duplicate member records. Finally, at step 110 a layout type is specified for the template. The layout type may comprise a page layout type or a tab layout type applicable to the presentation of the template. Having described definition of configurable templates, we now turn to describing definition of an extensible framework.

Figure 2:
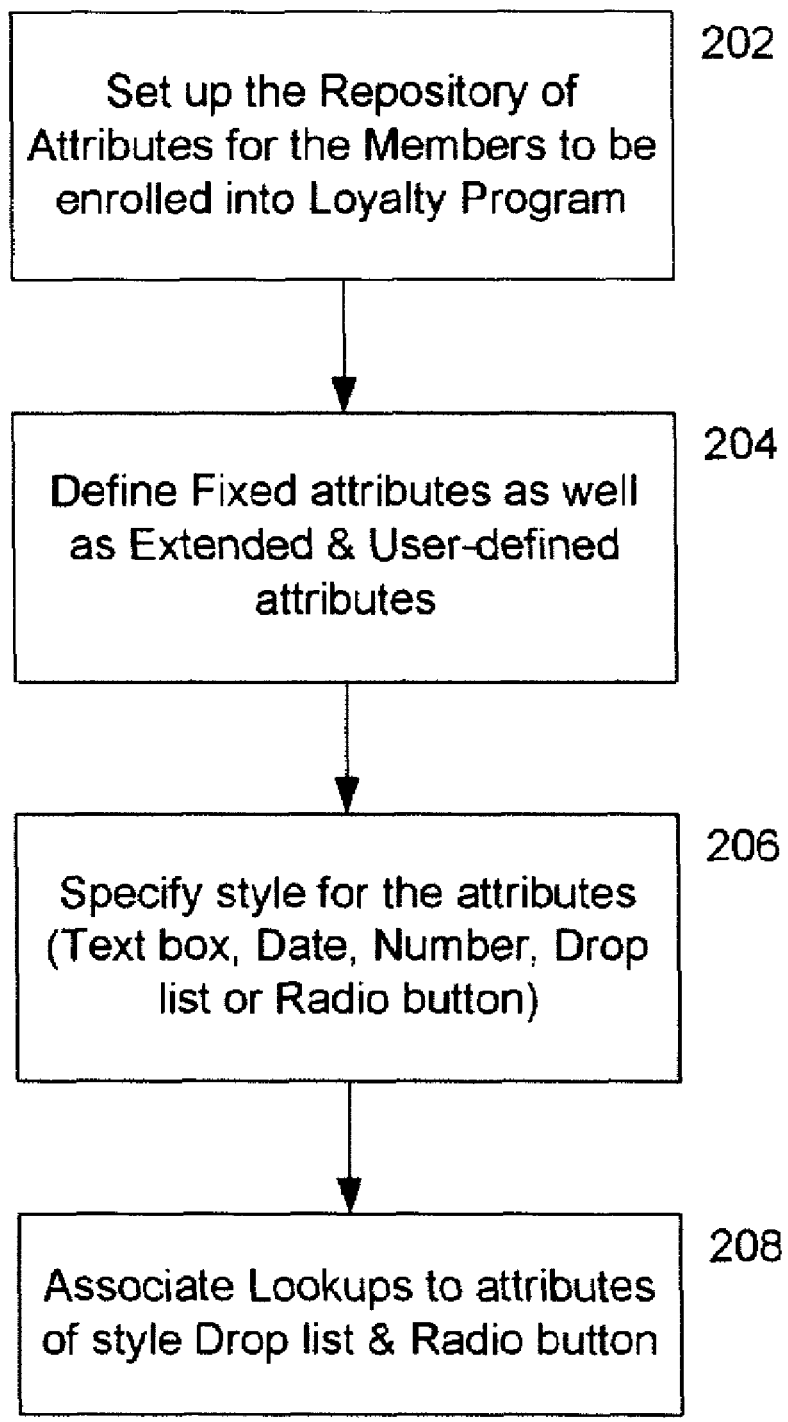
FIG. 2 is a flow diagram illustrating a method for defining an extensible attribute repository framework, in accordance with an embodiment of the present invention.

FIG. 2 is a flow diagram illustrating a method for defining an extensible attribute repository framework, in accordance with an embodiment of the present invention. This framework encompasses an extensible attribute repository as well as the setting up of enrollment templates based on membership schemes, membership types and channels used for enrollment. Step 202 sets up a repository of attributes for members that are to be enrolled into a loyalty program. The repository represents a universe of attributes, which can be used in the above-described definition of configurable templates. At step 204, one or more of the attributes are designated as fixed attributes, extended attributes, and/or user-defined attributes.

Step 206 defines one or more styles for the defined attributes. A style comprises a text box, a date, a number, a drop list, a radio button or any other style applicable to an attribute. At step 208, one or more lookups are associated to attributes whose styles comprise a drop list or a radio button.

Advantageously, the present invention provides a flexible and configurable enrollment data capture framework that will enable an airline to set up and manage an extensible repository of data elements to be captured during the process of enrollment of new members. It will further enable airlines to setup and configure enrollment templates specific to a membership scheme and membership type and channel involved. The methods of the present invention also help airlines to better manage customer data quality and enhance the overall effectiveness of core CRM processes like Campaign Management sales promotions, etc.

The above-described configurable templates and extensible attribute repository frameworks may be stored as data structures on computer readable media for storage or for electronic transmission to or from a computer.

As should be obvious to one of ordinary skill in the art, the techniques described herein are by no means limited to airline loyalty enrollment programs. The presented techniques may be used for any customer facing marketing initiative or application that can benefit from tailoring the requested customer data to the particular circumstances of the marketing initiative, such as the particular communication channel used, the membership scheme sought or the type of membership targeted.

Foregoing described embodiments of the invention are provided as illustrations and descriptions. They are not intended to limit the invention to precise form described. Other variations and embodiments are possible in light of above teachings, and it is thus intended that the scope of invention not be limited by this Detailed Description, but rather by Claims following.

We claim:

1. A method for defining a loyalty program enrollment data capture framework, the method comprising:
   defining, at a computer, one or more attributes for members to be enrolled into a membership program;
   associating, at the computer, one or more styles with the one or more attributes;
   associating, at the computer, one or more lookups with one or more of the attributes;
   defining, at the computer, an extensible attribute repository for the data capture framework, based on the one or more attributes, the one or more styles, and the one or more lookups;
   defining, at the computer, a plurality of different data capture templates to capture enrollment data from prospective members of the loyalty program upon enrollment in the loyalty program, each of the data capture templates indicating member information to be collected when member enrollment proceeds according to a plurality of enrollment parameters via one of a plurality of different physical enrollment channels, wherein one or more of the different data capture templates are defined for each of the plurality of different physical enrollment channels;
   specifying, at the computer, the plurality of membership program enrollment parameters for each of the data capture templates wherein the plurality of enrollment parameters include parameters indicating a membership scheme of a plurality of different membership schemes, a membership type of a plurality of different membership types, and an enrollment channel of the plurality of different physical enrollment channels;
   selecting, at the computer, from the attribute repository a set of one or more attributes to be rendered for each data capture template based on the plurality of enrollment parameters; and
   presenting, by the computer, to an enrolling member one of the data capture templates based on an enrollment channel, membership type, and membership scheme of the enrolling member.

2. The method of claim 1, wherein the one or more styles are selected from the group consisting of a text box, a date, a number, a drop list and a radio button.

3. The method of claim 1, wherein
   associating one or more lookups with one or more of attributes comprises associating one or more lookups with the attributes whose styles comprise a drop list or a radio button.

4. The method of claim 1, wherein:
   specifying the plurality of enrollment parameters comprises defining a particular set of circumstances under which potential members of the loyalty program may enroll in the loyalty program based on membership scheme, membership type, and enrollment channel;

and
the method further comprises:
specifying, at the computer, a layout type of a plurality of layout types for each data capture template.

5. The method of claim 4, wherein the enrollment channel dictates the type and amount of information that can be collected from prospective members of the loyalty program.

6. The method of claim 5, wherein the plurality of enrollment channels includes the world wide web.

7. The method of claim 6, wherein the plurality of enrollment channels includes a short messaging service (SMS) channel.

8. The method of claim 7, wherein the plurality of membership types includes a corporate membership.

9. The method of claim 8, wherein the plurality of membership types includes a family membership.

10. The method of claim 9, wherein the plurality of membership schemes includes a senior citizen's club.

11. The method of claim 10, wherein the plurality of membership schemes includes a chairmen's club.

12. The method of claim 11, further comprising:
designating as mandatory a subset of the selected set of one or more attributes.

13. The method of claim 12, wherein the plurality of layout types include a page layout and a tab layout.

* * * * *